Patented Oct. 8, 1946

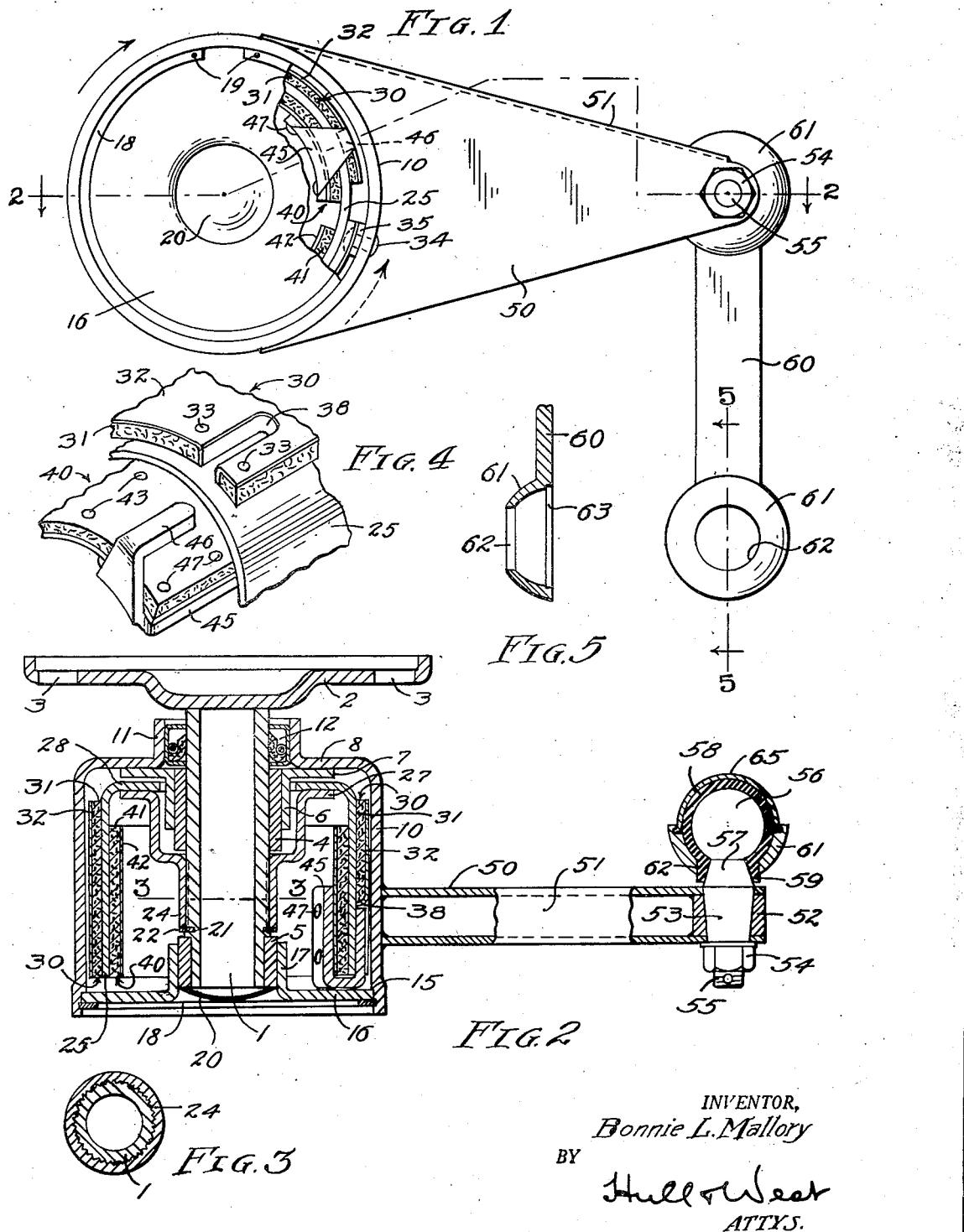

2,408,985

UNITED STATES PATENT OFFICE 2,408,985

SHOCK ABSORBER

Bonnie L. Mallory, Cleveland Heights, Ohio, assignor to The B. L. Mallory Company, Hazel Park, Mich., a corporation of Michigan Application December 29, 1944, Serial No. 570,253

8 Claims. (Cl. 188—130)

My present invention has to do with improvements in the type of shock absorber disclosed in Patent No. 2,326,665, granted to me on August 10, 1943. The instant invention has, in common with that which forms the subject matter of said patent, the general objects of providing a shock absorber of the friction type that is very smooth and silent of operation; that requires no lubrication; that is very durable and practically immune from disorder; that is capable of being manufactured at low cost, and that ordinarily does not require attention or adjustment after installation.

Another object of the present invention is to provide a construction that facilitates changing the power of the shock absorber to make it suitable for vehicles of different weight, this being accomplished by the selection of an energizing band of appropriate spring strength or resiliency during assembly and simply inserting it into the brake drum, the connection between the energizing band and brake band being effected by this same operation.

Another object is to provide a shock absorber that is light of weight, compact, and very strong, and that, during fabrication, because of the reversibility of its parts, may be adapted for use on either the right or left hand side of the vehicle, these several ends being attained by constructing the device largely of symmetrical sheet metal stampings.

A further and more limited object is to provide a shock absorber including a housing that is normally closed at the front by a readily removable cover. This construction affords quick and easy access to the enclosed parts, and facilitates changing of the energizing band in order to alter the power of the shock absorber should it be found, after installation, that the shock absorbing qualities of the device are not right for the weight of the vehicle and its customary load.

A still further object of the invention is to provide a link assembly that is simple, durable and strong, for connecting the arm of the shock absorber to a part of the vehicle, said link assembly consisting of few parts, the principal ones of which are sheet metal stampings.

The foregoing objects and advantages, with others hereinafter appearing, are attained in the embodiment of the invention illustrated in the accompanying drawing wherein like reference characters designate corresponding parts throughout the several views.

In the drawing, Fig. 1 represents a side elevation of my improved shock absorber, and the link by which its arm is adapted to be connected to a part of the vehicle, the cover of the housing being partly broken away to reveal some of the enclosed parts; Fig. 2 is a sectional plan substantially on the line 2—2 of Fig. 1; Fig. 3 is a section on the line 3—3 of Fig. 2; Fig. 4 is a fragmentary exploded perspective view of the brake drum, the brake band and the energizing band, and Fig. 5 is a sectional detail of the link, as indicated by the line 5—5 of Fig. 1.

A tubular spindle 1 is secured, as by welding, to a mounting or flange 2 that is adapted to be attached by suitable fastening means to a part of a vehicle, the flange having holes 3 for the accommodation of said fastening means, such as bolts or the like. On the spindle 1 are cylindrical bearings 4 and 5, desirably of the oilless variety, and mounted on the bearing 4 is a flanged hub 6 that is welded or otherwise secured, through its flange 7, to the end wall 8 of a cylindrical housing 10. Said end wall 8 has a central tubular boss 11 of sufficient size to accommodate a so-called "oil seal" 12 of standard construction between it and the spindle 1. By this means, dust, mud and water are prevented from entering the rear end of the housing.

Adjacent its front end, the housing 10 is slightly enlarged in diameter to provide an internal shoulder 15 inwardly against which is seated an annular cover 16 having a central hollow boss 17 that is engaged over the previously mentioned bearing 5. The cover is held within the end of the housing 10 by an expanding locking ring 18 that is received by a circumferential groove in the enlarged end of the housing immediately adjacent the cover 16. The separated ends of the locking ring 18 have apertures 19 for the reception of parts of a tool by which the ring may be contracted when it is desired to withdraw it from the aforesaid groove and release the cover 16. A concavo-convex disk 20 of relatively thin stiff sheet metal is expanded within the outer end of the boss 17 to cover the bearing 5 and the spindle 1.

The outer end portion of the spindle 1 is reduced in diameter for the reception of the previously mentioned bearing 5, and a short distance inwardly of the inner end of said bearing, the spindle is provided with a circumferential groove 21 for the reception of a contracting locking ring 22. Inwardly beyond the groove 21, the outer surface of the spindle is serrated, as best shown in the sectional detail of Fig. 3.

Pressed on and interengaged with the serrated portion of the spindle 1 is the hub 24 of a brake drum 25, said hub being enlarged rearwardly of the serrated portion of the spindle so as to accommodate the bearing 4 and hub 6 of the housing, the hub of the brake drum being provided with a flange 27 at its rear end. Said flange is secured by welding or otherwise to the annular end wall 28 of the brake drum.

The majority of the foregoing parts, which will be readily identified by those skilled in the art, preferably consist of sheet metal stampings.

Encircling the brake drum 25 is a brake band that is designated generally by the reference numeral 30, and is composed of a layer 31 of suitable friction material, such as that used for brake linings, and an overlying metal strip 32, said layer and strip being connected together at intervals throughout their lengths by rivets, in a common and well known manner, two such rivets being designated 33 in Fig. 4. One end of the brake band 30 is connected by suitable fastening means, such as rivets, to the peripheral wall of the housing 10, one of the rivets being designated 34 in Fig. 1. A spacer 35 is shown as interposed between the wall of the housing and the brake band. Near its opposite end, the brake band has a recess or notch 38 that opens through the side of the band adjacent the front of the housing.

Occupying the brake drum and expanded outwardly against the same is an energizing element or band 40 that, according to the present embodiment, is made up of a layer 41 of friction material, which may be the same as that previously mentioned, and an underlying strip of resilient metal 42, said strip and layer being connected together at intervals throughout their lengths by rivets, some of which are designated 43 in Fig. 4.

Secured to the inner side of the energizing band, adjacent one end thereof, is the base 45 of a finger 46, the latter being spaced radially outwardly from the energizing band and, when the parts are properly assembled, said finger occupies the notch 38 of the brake band 30. The base 45 of the finger 46 is connected to the energizing band by rivets 47.

Welded or otherwise secured to the peripheral wall of the housing 10 is an arm 50. This arm is preferably made of sheet metal in the form of a deep, narrow channel, the web of which constitutes the top 51 of the arm. A bushing 52 is secured, as by welding, between the outer extremities of the side flanges of the arm and, with said flanges, is provided with a tapered bore within which is held the tapered body portion of a stud 53 by a nut 54 that is applied to the threaded shank 55 of the stud. The stud has a spherical head 56 that is joined to the body portion of the stud by a neck 57. A bushing 58 of suitable material, such as that known to the trade as "neoprene," encloses the head 56 and has a lateral collar-like extension 59 that surrounds the neck 57 of the stud.

60 is a link, desirably consisting of a heavy gauge sheet metal stamping that is formed at its ends with semi-spherical cups 61 having central apertures 62. When the link is originally formed, the inner edges of the perimeters of the cups 61 are rabbeted, as shown at 63 in Fig. 5. Fitted into each of the cups 61 is a stud and bushing assembly, like the parts designated 53 and 58 above, with the extension 59 of the bushing occupying the aperture 62 of the cup. A semi-spherical cap 65, having its edge flared outwardly about its open side, is snugly fitted over the protruding portion of the bushing 58 with said edge seated within the rabbet 63 of the corresponding cup 61, after which the surrounding metal is peened over said flared edge so as to permanently secure the cap to the cup.

From the nature of the foregoing construction it will be apparent that the link with the studs may be manufactured and distributed to the trade as a pre-fabricated unit.

In the installation of the shock absorber, the mounting or flange 2 is secured to a part of the vehicle structure, and the end of the link 60, remote from that pivoted to the arm 50, is connected, by a stud assembly, to another part of the vehicle that is relatively movable with respect to the first mentioned part, the one part being spring-suspended from the other in the usual and well known manner.

It is obvious, from the nature of their connection above described, that the brake drum 25 is fixed against rotation on the spindle 1. It is also pointed out above that the spindle is secured against rotation to the mounting or flange 2, and that the latter is fixedly attached to a part of the vehicle. The housing 10, being journaled on the spindle, is therefore caused to oscillate about the drum when the aforesaid part of the vehicle moves toward and from the part to which the link 60 is connected. When the housing rotates in the direction of the full-line arrow in Fig. 1, the brake band 30 relaxes its hold on the brake drum, this action resulting from the fact that the end of the brake band that is secured to the housing moves with the latter, while the opposite end of the brake band is held back by reason of its connection, through the finger 46, with the energizing element or band 40 that is expanded against the inner side of the brake drum and tends to retain its position with respect thereto. Upon a reversal of the direction of rotation of the housing, indicated by the dotted-line arrow in Fig. 1, the brake band 30 is caused to tighten its grip on the brake drum on account of its positive connection at one end with the housing, and at the other end with the energizing element or band 40, the latter imposing a drag on the brake band in opposition to the pull caused by the movement of the housing.

Having thus described my invention, what I claim is:

1. A shock absorber comprising a mounting, a brake drum non-rotatably supported thereby, a housing enclosing the drum and sustained for oscillation on the axis thereof, a brake band encircling the drum and having one of its ends fixed with respect to the housing, an energizing element frictionally engaging the inner surface of the drum, means connecting the energizing element to the end of the brake band opposite the one fixed with respect to the housing, the aforesaid mounting being adapted for attachment to one part of a vehicle, and means operatively connected to the housing for attachment to another part of the vehicle that is relatively movable with respect to the first mentioned part whereby when one part moves toward and from the other part the housing will be caused to oscillate with respect to the brake drum.

2. A shock absorber comprising a mounting, a brake drum non-rotatably supported thereby, a housing supported for oscillation about the axis of the drum and including a peripheral wall surrounding the drum and radially spaced therefrom, a brake band encircling the drum and having one of its ends attached to the peripheral wall of the housing, an energizing element frictionally and yieldingly engaging the inner surface of the brake drum, means connecting said element to the end of the brake band opposite the one that is attached to the peripheral wall of the housing, the aforesaid mounting being adapted for attachment to one part of a vehicle, and means operatively connected to the housing for attachment to another part of the vehicle that is relatively movable with respect to the first mentioned part and of such nature that when one part moves toward and from the other part the housing is caused to oscillate with respect to the brake drum.

3. A shock absorber comprising a mounting, a brake drum non-rotatably supported thereby, a housing enclosing the brake drum and sustained for oscillation on the axis thereof, a brake band encircling the drum and having one of its ends fixed with respect to the housing, said band having a recess adjacent its opposite end that opens through one edge of the band, an energizing element yieldingly and frictionally engaging the inner surface of the brake drum, a finger occupying the aforesaid recess of the brake band and having a part secured to said energizing element, the aforesaid mounting being adapted for attachment to a part of a vehicle, and means operatively connected to the housing for attachment to another part of the vehicle that is relatively movable with respect to the first mentioned part so that when one part moves toward and from the other part the housing will be caused to oscillate with respect to the brake drum.

4. A shock absorber comprising a mounting, a brake drum non-rotatably supported thereby, a housing enclosing the brake drum and supported for oscillation about the axis of the drum, a brake band encircling the drum and having one of its ends fixed with respect to the housing, a resilient energizing band expanded against the inner surface of the drum, connections between the aforesaid end of the brake band and the corresponding end of the energizing band, the aforesaid mounting being adapted for attachment to a part of a vehicle, and means operatively connected with the housing for attachment to another part of the vehicle that is relatively movable with respect to the first mentioned part so that when one part moves toward and from the other part the housing will be caused to oscillate with respect to the brake drum.

5. A shock absorber comprising a mounting, a brake drum non-rotatably supported thereby, a housing supported for oscillation about the axis of the drum and including a peripheral wall surrounding the drum and radially spaced therefrom, a brake band encircling the drum and having one of its ends attached to the peripheral wall of the housing, said band having a recess adjacent its opposite end that opens through one edge of the band, a resilient energizing band expanded against the inner surface of the brake drum, a finger occupying the recess of the brake band and having a part extending radially inwardly about one end of the drum which terminates in a base portion connected to the inner side of the energizing band, the aforesaid mounting being adapted for attachment to a part of a vehicle, and means operatively connected to the housing for attachment to another part of the vehicle that is relatively movable with respect to the first mentioned part, said means being of such nature that when one part moves toward and from the other part the housing will be caused to oscillate with respect to the brake drum.

6. A shock absorber comprising a flange, a spindle carried by the flange, a hollow brake drum surrounding the spindle and having, intermediate its ends, a hub that surrounds the spindle and is fixed thereto against rotation, a bearing on the spindle beyond each end of said hub, a housing including a peripheral wall that surrounds the drum in radially spaced relation thereto, the housing having an end wall provided with a hub that is journaled on one of the aforesaid bearings, a cover applied to the end of the housing remote from said end wall and having a central tubular boss that is journaled on the other of said bearings, a brake band encircling the brake drum and having one of its ends fixed with respect to the housing, an energizing element frictionally engaging the inner surface of the brake drum, means connecting said energizing element with the end of the brake band opposite the one fixed with respect to the housing, the aforesaid flange being adapted for attachment to one part of a vehicle, an arm on the housing, and means for attaching a portion of said arm remote from the housing to another part of the vehicle that is relatively movable with respect to the first mentioned part whereby when one part of the vehicle moves toward and from the other part the housing is caused to oscillate about the axis of the spindle.

7. A shock absorber comprising a mounting, a tubular spindle carried by the mounting, a hollow sheet metal brake drum surrounding the spindle and having an annular end wall, a sheet metal hub surrounding the spindle and fixed thereto, the hub having an end flange secured to the end wall of the drum, a bearing on the spindle beyond each end of said hub, a sheet metal housing including a peripheral wall that surrounds the drum in radially spaced relation thereto and an annular end wall, a sheet metal hub that is journaled on one of the aforesaid bearings and provided with an end flange secured to the end wall of the housing, a sheet metal cover applied to the end of the housing remote from said end wall and having a central tubular boss that is journaled on the other of said bearings, a brake band encircling the brake drum and having one of its ends fixed with respect to the housing, an energizing element frictionally engaging the inner surface of the brake drum, means connecting said energizing element with the end of the brake band opposite the one fixed with respect to the housing, the aforesaid mounting being adapted for attachment to a part of a vehicle, a sheet metal arm consisting of a deep channel having one of its ends secured to the peripheral wall of the housing, and means attaching a portion of said arm remote from the housing to another part of the vehicle that is relatively movable with respect to the first mentioned part whereby when one part of the vehicle moves toward and from the other part the housing is caused to oscillate about the axis of the spindle.

8. A shock absorber comprising a flange, a spindle carried thereby, a bearing surrounding the outer end of the spindle, a second bearing surrounding the spindle in spaced relation to the first mentioned bearing, a hollow brake drum having a hub intermediate its ends surrounding the spindle between the aforesaid bearings, said hub being fixed to the spindle by serrations of the latter that are embedded in the hub, the hub being connected to the end of the brake drum nearest said flange, the opposite end of the drum being open, a housing consisting of a cylindrical wall that surrounds the brake drum in radially spaced relation thereto and an annular end wall adjacent the aforesaid flange, a hub on said end wall that is journaled on the second mentioned bearing, the end of the housing remote from said flange being open and provided with a forwardly facing circumferential shoulder, an annular cover fitted inwardly against said shoulder and provided with an inwardly projecting tubular boss journaled on the first mentioned bearing, a disk fitted into the outer end of said boss to conceal the first mentioned bearing and the adjacent end of the spindle, the housing having an internal circumferential groove adjacent the cover, an expanding locking ring occupying said groove, the end wall of the housing being provided with a central hollow boss spaced radially from the spindle and projecting toward the aforesaid flange, an oil seal surrounding the spindle within the last mentioned boss, an arm secured to and extending laterally from one side of the housing, a brake band encircling the brake drum and having one of its ends secured to the cylindrical wall of the housing, said band having a notch adjacent its opposite end that opens through the edge of the band adjacent the open end of the brake drum, said brake band consisting of a layer of friction material for engagement with the brake drum and an overlying strip of metal suitably attached thereto, said strip of metal being deformed into the aforesaid notch to provide a reinforcement for the walls thereof, an energizing band expanded against the inner side of the brake drum and including a layer of friction material for engagement with the drum and an underlying strip of resilient metal suitably attached to said layer, a finger occupying the notch of the brake band and having a part extending radially inwardly about the end of the brake drum and a base at the inner end of said part that underlies the energizing band and is secured thereto.

BONNIE L. MALLORY.